Nov. 5, 1963

S. T. CARTER 3,109,529

ARTICLE COMBINING CONVEYOR APPARATUS

Filed July 6, 1961

INVENTOR.
Sidney T. Carter
BY
Roberts Cushman & Grover
ATTORNEYS

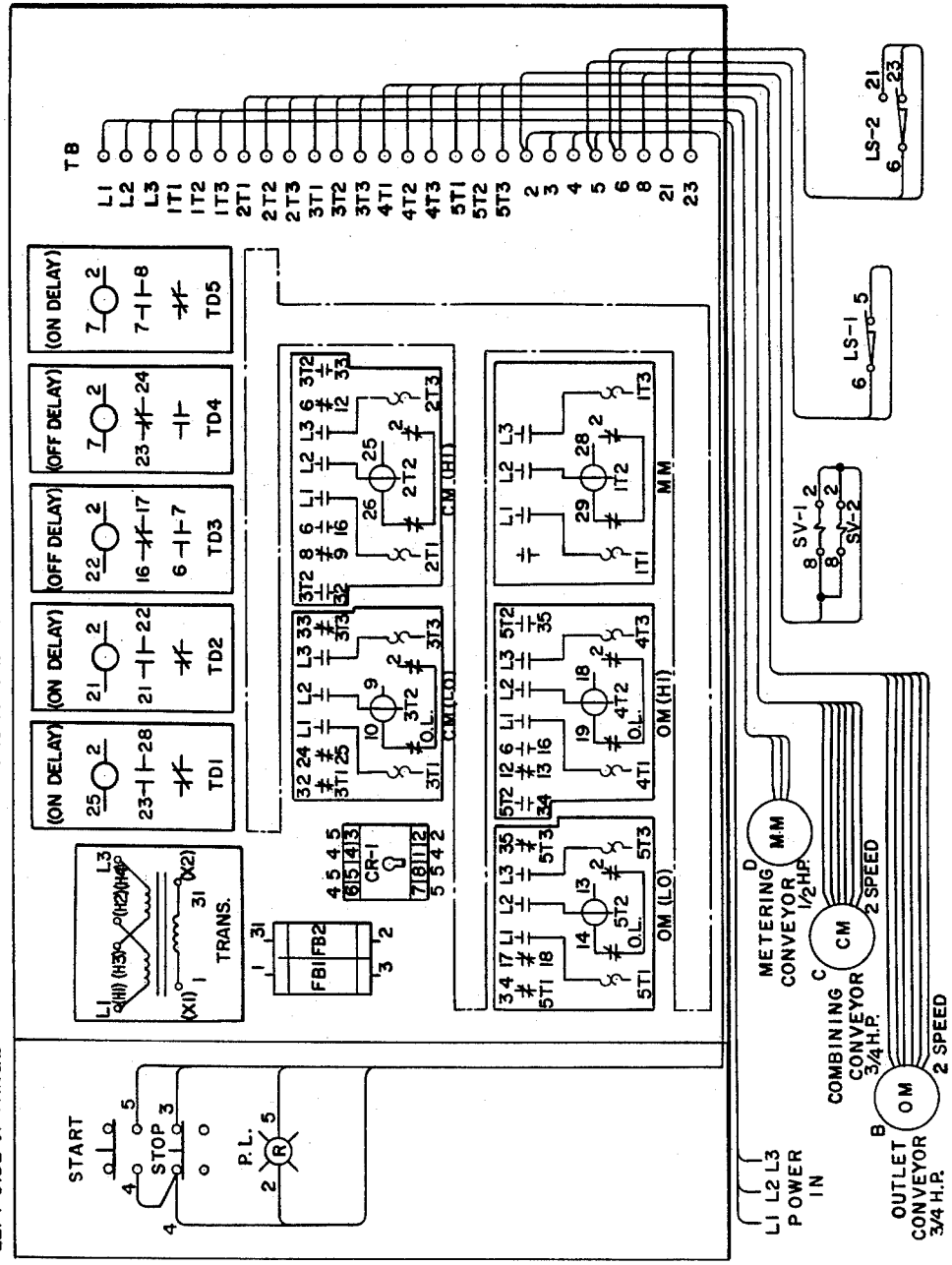

Nov. 5, 1963  S. T. CARTER  3,109,529
ARTICLE COMBINING CONVEYOR APPARATUS
Filed July 6, 1961  6 Sheets-Sheet 6

CR1 RELAY CONTACT ARRANGEMENT

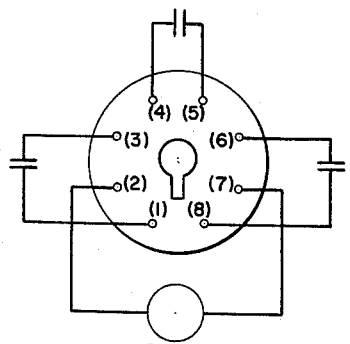

FIG. 8

INTERNAL PANEL CONNECTIONS

| WIRE | DEVICE | SIZE | COLOR |
|---|---|---|---|
| L1 | TB-MM-CM-CM-OM-OM | 12 | B |
| L2 | TB-MM-CM-CM-OM-OM | | |
| L3 | TB-MM-CM-CM-OM-OM | | |
| 1T1 | TB-STARTER | | |
| 1T2 | TB-STARTER | | |
| 1T3 | TB-STARTER | | |
| 2T1 | TB-STARTER | | |
| 2T2 | TB-STARTER | | |
| 2T3 | TB-STARTER | | |
| 3T1 | TB-STARTER | | |
| 3T2 | TB-STARTER | | |
| 3T3 | TB-STARTER | | |
| 4T1 | TB-STARTER | | |
| 4T2 | TB-STARTER | | |
| 4T3 | TB-STARTER | | |
| 5T1 | TB-STARTER | | |
| 5T2 | TB-STARTER | | |
| 5T3 | TB-STARTER | 12 | B |
| 1 | TRANS-FB | 14 | R |
| 2 | TB-FB-CR1-TD5-TD4-OL OL-TD3-TD2 | | |
| 3 | TB-FB | | |
| 4 | TB-CR1-CR1 | | |
| 5 | TB-CR1-CR1-CR1-CR1 | | |
| 6 | TB-TD3-CM-CM-OM | | |
| 7 | TD5-TD3-TD5-TD4 | | |
| 8 | TB-TD5-CM | | |
| 9 | CM-CM | | |
| 10 | CM-OL | | |
| 12 | CM-OM | | |
| 13 | OM-OM | | |
| 14 | OM-OL | | |
| 16 | CM-TD3-OM | | |
| 17 | TD3-OM | | |
| 18 | OM-OM | | |
| 19 | OM-OL | | |
| 21 | TD2-TD2-TB | | |
| 22 | TD2-TD3 | | |
| 23 | TB-TD4-TD1 | | |
| 24 | TD4-CM | | |
| 25 | TD1-CM-CM | | |
| 26 | CM-OL | | |
| 28 | TD1-MM | | |
| 29 | MM-OL | | |
| 31 | TRANS-FB | 14 | R |

FIG. 7

TIME DELAY SETTINGS

| TIME DELAY | SECONDS |
|---|---|
| TD-1 | 2 |
| TD-2 | 1 |
| TD-3 | 2 |
| TD-4 | 1 |
| TD-5 | 1 |

FIG. 9

United States Patent Office 3,109,529
Patented Nov. 5, 1963

3,109,529
ARTICLE COMBINING CONVEYOR APPARATUS
Sidney T. Carter, Shrewsbury, Mass., assignor to Geo. J. Meyer Manufacturing Co., Cudahy, Wis., a corporation of Wisconsin
Filed July 6, 1961, Ser. No. 122,178
9 Claims. (Cl. 198—30)

This invention pertains to conveyor apparatus, and more especially to an article combiner whereby articles, for example, bottles or cans, advancing in disorderly array or in a plurality of parallel rows, may be so intercalated as to form a single row for delivery of the articles, one after another in succession, to a processing machine or the like.

The urgent demand for increased production in the canning and bottling field has resulted in the development of certain types of processing apparatus, for example filling, capping, labeling machines, and the like, capable of operating at extremely high speeds. On the other hand, some processes necessarily require a longer period of time per article. Thus, as a practical matter, it is substantially necessary, in some manufacturing plants, to combine the output of several independent, relatively slow processing devices so as to form a single row for delivery to a high-speed machine. However, when it is attempted to combine articles, moving without definite order or in several distinct rows so as to form a single row wherein successive articles, in contact with one another, are required to move at a rate of the order of 500 to 800 per minute, great difficulty has been experienced because of the tendency of the articles to jam at the point where they are caused to merge to form a single row. This tendency to jam is partly due to the fact that the articles handled are not mathematically exact as to dimensions or shape, as well as to the inertia of the articles which resists their rapid diversion from one path to another; the inertia of movable parts of the apparatus itself; and the vibration resultant from the blows of the rapidly moving articles against deflecting surfaces of the apparatus, as well as against each other.

Such jamming of the articles often results in the deformation of cans, particularly if empty, or the cracking of bottles and, in any event delays the operation while the jam is being broken and while injured or shattered articles are removed, and, if the jam be serious, the lost time and labor costs involved may be very substantial.

The present invention has for its object the provision of conveyor apparatus designed for the combining of articles to form a single row in which the articles move, one after another, in succession and in contact with each other, in such a way the danger of the formation of a jam is very substantially reduced. A further object is to provide apparatus of the above type, such that, if a jam does form, the apparatus will automatically and quickly clear itself of the jam and automatically resume operations as soon as the jam is cleared. A further object of the invention is to provide conveyor apparatus of this type designed to combine several parallel rows of articles into a single row, and wherein the speed of one of the several conveyors comprised in the apparatus is adjustable to the capacity of the machine to which the articles are delivered, so that no more articles can be delivered by the conveyor apparatus than it is possible for the receiving machine to handle. A further object is to provide apparatus of the above type having provision whereby, in the event of the formation of a jam, one, at least, of the conveyors will be temporarily reversed in its direction of movement so as to decrease the pressure of the articles against each other at the point at which the jam occurs.

Other and further objects and advantages of the invention will be pointed out in the following more detailed description and by reference to the accompanying drawings wherein:

FIG. 6 is a composite front and side elevation of the control panel of the apparatus;

FIG. 7 is a chart showing the relation between the conductors, at the interior of the panel, and the devices which they connect;

FIG. 8 is a diagram illustrating the arrangement of certain of the contacts;

FIG. 9 is a chart indicating the time interval resultant from the functioning of certain conventional time-delay devices embodied in the apparatus; and FIG. 10 is a diagram showing the connections for controlling the pressure-fluid motor which actuates one of the movable guide rails.

In the attainment of the above objects, the present invention provides a series of parallel conveyors which may be of conventional type, but such that articles, while being advanced by a given conveyor, may be shifted transversely so as to divert them from said conveyor onto the next adjacent conveyor, and having means whereby each individual conveyor may be driven at a predetermined speed and in a predetermined direction relative to other conveyors, and comprising automatic means for determining the speeds, the stopping and starting of the conveyors and the temporary reversal of, at least, one of the conveyors.

Figure 2:
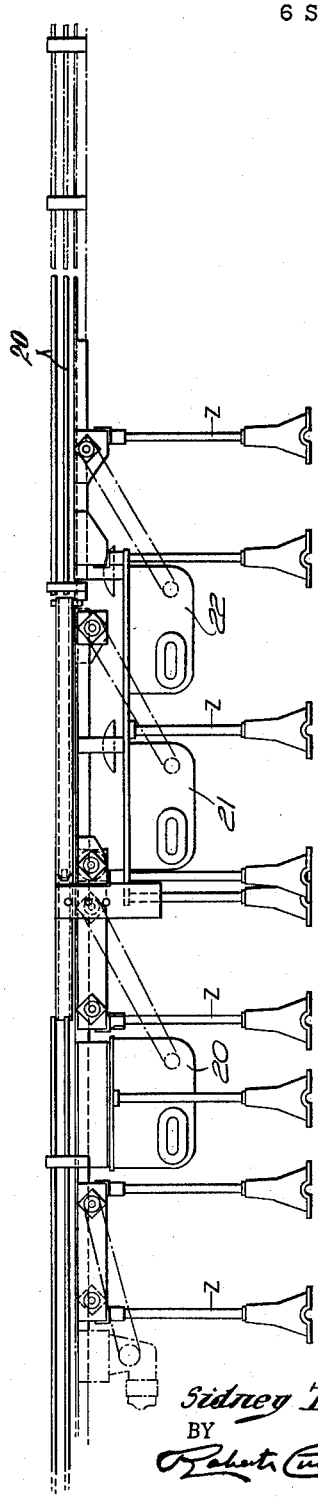
FIG. 2 is a diagrammatic side elevation of the apparatus of FIG. 1.

Referring to the drawings, the character A designates the conveyor which delivers the articles, after they have been placed in a single row, to the processing apparatus or device for which they are destined. This conveyor A is a single row conveyor and, as shown in FIG. 2, is provided with customary guard rails 20 to keep the advancing articles in proper alignment, and is driven continuously at a uniform, predetermined speed properly related to that of the processing apparatus to which it supplies the articles.

Figure 1:
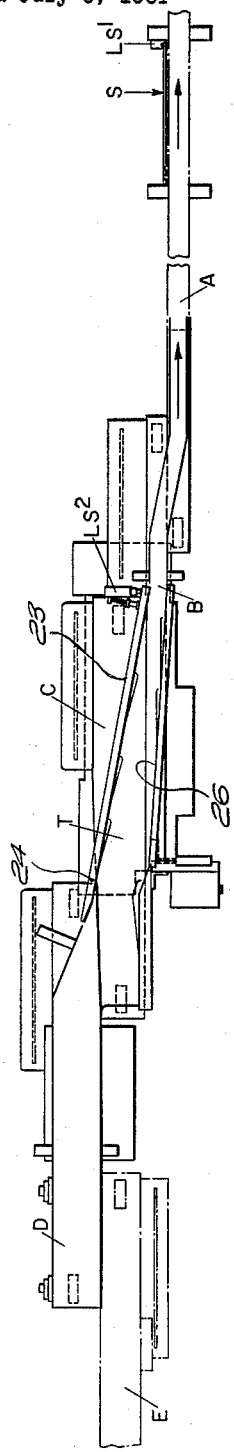
FIG. 1 is a small scale diagrammatic plan view of conveyor apparatus embodying the present invention, including the conveyor which actually delivers the articles to the apparatus for which they are destined.
Figure 3:
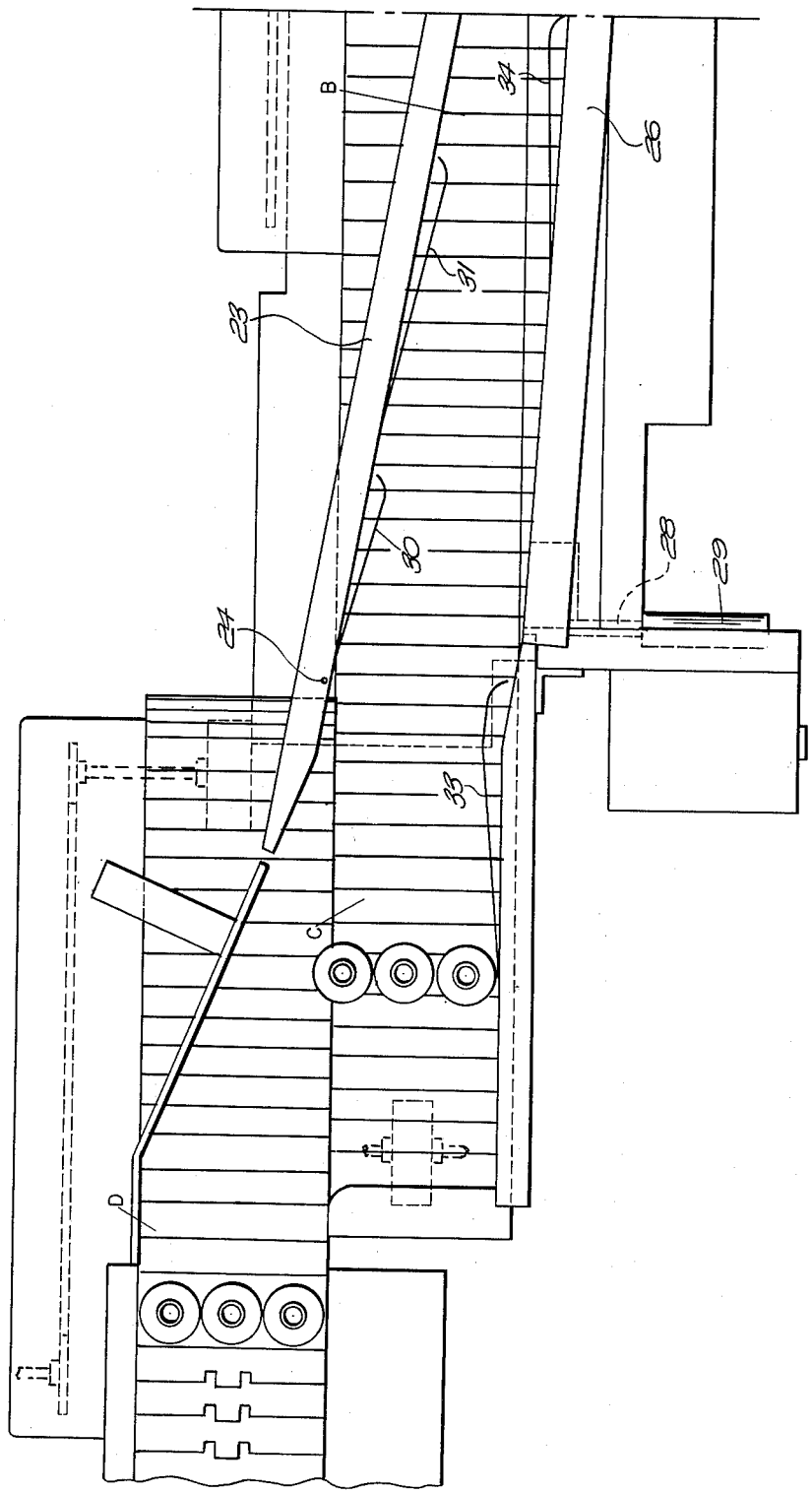
FIG. 3 is a plan view, to larger scale than FIG. 1, showing the midportion of the combiner of this invention.
Figure 4:
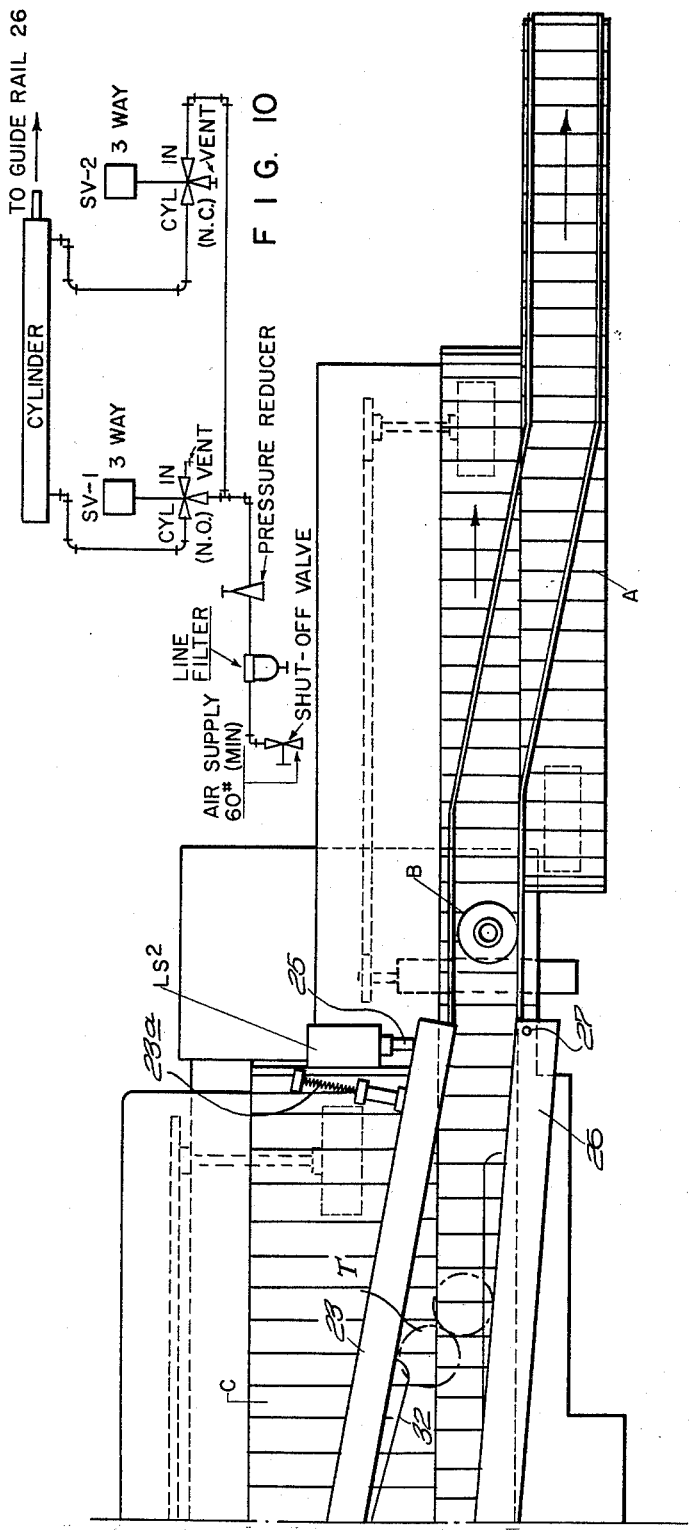
FIG. 4 is a view similar to FIG. 3, but showing the delivery end portion of the combiner.

The articles to be handled by the combining apparatus of the present invention are herein illustrated as supplied by a constantly running conveyor E (FIG. 1) which forms no essential part of the present apparatus, and wherein the articles may be advanced in distinct rows, or without any particular pattern or arrangement, and from this supply conveyor E the articles are diverted onto the metering conveyor D of the present invention which, as here illustrated, is of an effective width sufficient to accommodate three parallel rows of articles, although no provision is made for compelling the articles to form three distinct rows. The conveyor D as well as the conveyors C and B, may be of any suitable type, for instance a so-called Rex table-top chain, usually illustrated conventionally as shown, for example, at the extreme left-hand end of conveyor D in FIG. 3. The conveyors, the drive motors and associated parts are supported by a suitable frame mounted upon supports Z (FIG. 2). The conveyor D is driven at such a linear velocity that when loaded to a maximum capacity, the number of articles delivered by the conveyor D does not exceed the capacity of the processing apparatus to which the articles are to be supplied. The articles are deflected from conveyor D onto a conveyor C (FIGS. 1 and 4), which is here illustrated as of the same width as conveyor D (that is to say, of an effective width to accommodate three rows of articles), and from conveyor C the articles are diverted onto a conveyor B (FIGS. 1, 3 and 4), which is of a width to accommodate but a single row of articles. In passing from conveyor C to conveyor B, the articles are so jostled, by guide rails and deflectors, hereinafter more fully described, that, under normal conditions, the articles form themselves into a single row on the conveyor B. From the conveyor B the articles are diverted onto the conveyor A which, as above noted, is the final delivery conveyor and which is of a width to accommodate but a single row of articles.

The metering conveyor D is driven by a single-speed motor MM (FIG. 5), through a variable speed drive, of conventional type, housed in the casing 20 (FIG. 2), while the combining conveyor C is driven by a reversible motor CM (FIG. 5), whose speed, in reverse, is approximately one-half its forward speed and the connections being such that, when running at low speed, the conveyor C travels in the reverse direction. This motor CM with its driving connections is housed within the casing 21 (FIG. 2).

The conveyor B is driven by a two-speed motor OM (FIG. 6), equipped with a variable speed drive, its low speed being one-half the normal speed, and the connections being such that this conveyor always runs in the same direction. This motor OM with its drive connections is housed within the casing 22 (FIG. 2). For intercalating the articles carried by the conveyor C, as they are delivered to the conveyor B, so as to arrange them in a single row, there is provided a converging throat T (FIG. 1) one wall of which is constituted by a movable guide rail 23 (FIGS. 1, 3 and 4), pivoted at 24 to swing in a horizontal plane, and having its free or right hand end (as viewed in FIG. 1) arranged to contact the actuating pin 25 (FIG. 4) of a control switch LS² (FIGS. 1, 4, 5 and 6). A spring 23a tends to keep said end of the guide rail out of switch-actuating position.

The other side of the converging throat T is constituted by a guide rail 26 (FIGS. 1, 3, and 4), pivoted at 27 (FIG. 4) to move in a horizontal plane and its free or left hand end (as viewed in FIG. 3) engages the piston rod 28 of a pressure-fluid motor comprising the cylinder 29.

The guide rail 23 is provided, at its inner side, with a plurality of leaf springs 30, 31 and 32, as here shown, while at the opposite side of the conveyor path there are provided leaf springs 33 and 34, the latter being mounted on the guide rail 26. These guide rails, with the leaf springs, are designed to funnel the articles, being advanced by the conveyor C, into a single line for delivery onto the conveyor B.

As above noted, the number of articles advanced by the conveyor D determines the capacity of the apparatus. Assuming that the conveyor D (when loaded to maximum capacity) carries three parallel rows of articles and that the processing apparatus, to which articles are to be supplied, can handle M articles per minute, and if $d$ is the diameter in inches of each article, then SM (the required speed of the conveyor D in feet per minute), equals $$\frac{M \times d}{3 \times 12}$$

This is the speed in feet per minute of the conveyor D when running at full capacity.

Experimental tests show that for best efficiency, the conveyor C should run 4.5 times the speed of conveyor D when carrying cans, but only about 3.5 times the speed of conveyor D while carrying bottles, and the speed of conveyor B, while carrying cans or bottles, should be 1.1 times the speed of conveyor C. Obviously, the speed of conveyor A must be, at least, equal to that of conveyor B and preferably should be approximately 5% faster.

In the operation of any type of combining conveyor, regardless of its design, there will eventually be a time when two articles, disposed exactly side-by-side, will crowd into the converging throat of the combining device and will jam so as to block the conveyor path. Usually, in order to break such a jam, the services of an operator are required. In accordance with the present invention, when such a jam occurs between the adjacent ends of the guide rails 23 and 26, the pressure exerted against the free end of the guide rail 23 will swing the latter outwardly, in opposition, to the spring 23a and thus, by contact with the switch pin 25, so actuate the switch LS2 as (by the circuit provided, FIG. 5) momentarily to cut off current to the motors MM and CM and thus stop the conveyors D and C. The resultant reduction in the pressure of the articles supported by conveyors D and C, may be sufficient to permit the still-operating conveyor B to loosen the jammed articles and thus break the jam. If this occurs within one second after the actuation of switch LS², the circuit of motor CM is restored so that conveyor C starts, and after a delay of two seconds, the circuit of motor MM is closed through the action of the time delay device TD¹. If the conveyors D and C are thus started into the operation, the jam having been broken, the spring 23a restores the guide rail 23 to normal position and thus the switch LS² is again closed and the apparatus continues in normal operation.

If the jam is not released, after one second delay from the time at which the switch LS² is opened, then the motor OM is started through the action of a time delay device TD² and drives conveyor B at half speed in the normal direction. After one more second delay (the switch LS² still remaining open) the motor CM, through the operation of the time delay device TD⁵, starts running at half speed in the reverse direction so as to drive the conveyor C reversely and, at the same time, the solenoid valve SV¹ admits pressure fluid to the air cylinder 29 so as to swing the free end of guide rail 26 away from the conveyor path. This will clear the jam since all articles are now travelling away from the combiner throat on the reversely moving conveyor C, except those which are standing on the conveyor B which is now slowly moving in the normal direction. The instant the jam is cleared, the spring 23a returns guide rail 23 to its normal position, closing the switch LS². After closing of the switch LS² and after a time delay of two seconds, provided for by time delay TD³, the motor CM stops so that the conveyor C stops, at the same time the solenoid valve SV¹ is actuated to return the guide rail 26 to its normal position. One second later, the time delay device TD⁴ causes the motor CM to start again in the normal direction and at normal speed, thus returning the conveyor C to its normal operation; at the same instant, the motor OM changes from half speed to normal speed; and two seconds after motor OM starts, the time delay device TD¹ permits the conveyor D to start and the apparatus is thus restored to normal operating condition.

The apparatus will, of course, comprise a manually-actuatable starting switch and a manually-actuatable stopping switch and, desirably, a signal lamp to indicate whether the apparatus is in operating condition or not.

Figure 5:
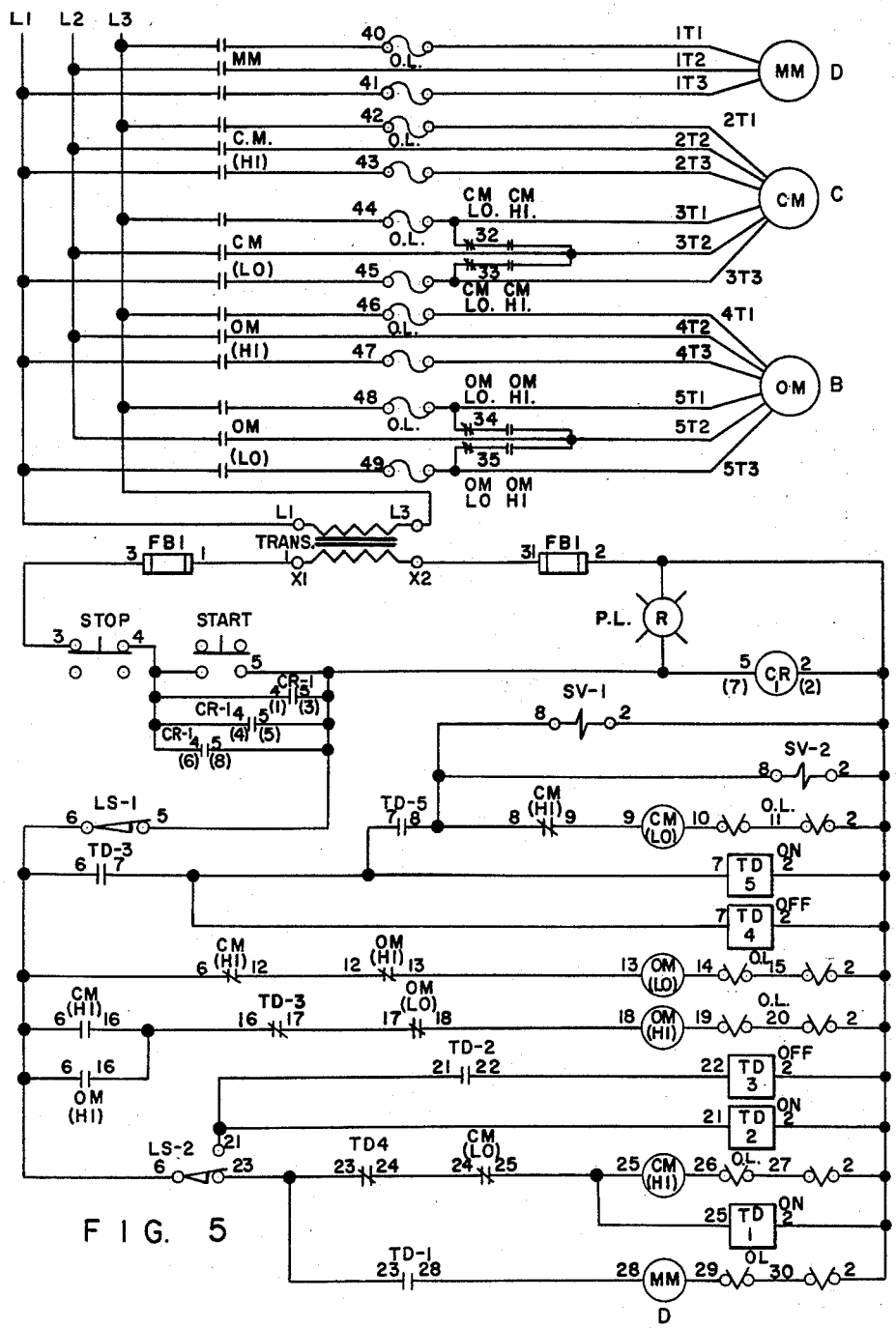
FIG. 5 is a wiring diagram showing the electrical connections whereby the drive of the several conveyors of the combiner is controlled.

In the drawings, the wiring circuit is illustrated in detail in FIG. 5; the arrangement of the necessary connections on the control panel is shown in FIG. 6, and FIG. 7 is a diagram of the internal panel connections. Since the various parts and connections are suitably identified and illustrated in conventional manner, and thus readily understood by one skilled in the art, it is unnecessary to describe all of the various circuits in detail herein.

The apparatus, as herein described, is capable of taking cans from a three-row conveyor and combining them to form a single row at speeds up to 800 cans per minute, or even up to 1,000 cans per minute, although with less efficiency at the latter speed. It will combine 12-ounce empty bottles efficiently up to speeds of 100 bottles per minute, or even up to 500 bottles per minute under ideal operating conditions, although the best efficiency is not normally observed above 450 bottles per minute. Twelve-ounce filled bottles will combine efficiently at speeds up to 500 bottles per minute and, under ideal conditions, at speeds of 600 bottles per minute. Short, relatively thick bottles can be handled at slightly higher speeds because of their greater stability and lesser tendency to tip over upon the occurrence of a jam.

The conveyor A, which receives the articles in a single row from the discharge conveyors B of the combiner, delivers the articles to the processing apparatus which, under normal conditions, receives the articles as rapidly as they are supplied by the conveyor A. As above noted, the conveyor D is so dimensioned and driven at such a speed as to insure that articles will not be offered to the processing apparatus any faster than the latter can accept them. However, if for any reason the processing apparatus will no longer receive the articles as fast as they are presented by the conveyor A, articles will stall on the conveyor A and, in so doing, will press outwardly against a switch-controlling gate G (FIG. 1) and thereby open a switch LS¹ (FIGS. 1 and 5) which breaks the circuits of all three motors MM, CM and OM, so that conveyors B, C and D stop. When articles are again free to proceed along the conveyor A, the pressure on the gate G is released and the switch LS¹ closes and the combining conveyor motor CM and the discharge conveyor motor OM start at once. However, in order to provide time for the articles which may have accumulated in the combining throat during the stoppage to be dissipated in the intended manner, the starting of the motor MM is delayed by action of time delay device TD¹ for two seconds so that, for a short time, the conveyor D fails to supply any articles to the receiving end of the throat.

While one desirable embodiment of the invention is herein disclosed by way of example, it is to be understood that the invention is broadly inclusive of any and all modifications falling within the scope of the appended claims.

I claim:

1. An article-combiner comprising a metering conveyor, a combining conveyor, and a discharge conveyor, drive means for each respective conveyor, the several conveyors normally moving in the same direction, means defining a converging throat into which articles are delivered by the combining conveyor and from whose narrow end articles emerge to form a single row on the discharge conveyor, in combination, means whereby the width of the delivery end of the converging throat may automatically increase in response to the jamming of articles in said converging throat, means responsive to the increase in width of the converging throat to stop the combining conveyor, and means operative, if the jam is not relieved within a period of two seconds after the metering and combining conveyors stop, automatically to increase the width of the receiving end of the converging throat.

2. An article-combiner comprising a metering conveyor, a combining conveyor and a discharge conveyor, drive means for each respective conveyor, the several conveyors normally moving in the same direction, means defining a converging throat into which articles are delivered by the combining conveyor and from whose narrow end articles emerge to form a single row on the discharge conveyor, in combination, means operative automatically to stop the metering conveyor and the combining conveyor in response to the jamming of articles within said converging throat, the converging throat having opposite walls, one of which comprises an elongate rigid article-guiding rail pivotally mounted at one end adjacent to one edge of the combining conveyor and extending diagonally across said conveyor so as normally to terminate adjacent to the opposite edge of said conveyor, spring means tending to hold said latter end of the guide rail in normal position, an electrical switch having an actuating element so disposed relatively to said guide rail as to be actuated by outward motion of the free end of said guide rail, the other wall of the converging throat comprising an elongate rigid guide rail pivotally supported at such a distance from the free end of the first-named guide rail as, with the latter, to define the narrow end of the converging throat, the free end of the second-named guide rail being positioned substantially opposite to the pivotal axis of the first-named guide rail and at the opposite edge of the combining conveyor, a fluid-pressure motor having a piston rod connected to the free end of the second-named guide rail and which is normally operative to hold said rail in operative position, and means for admitting pressure fluid to said motor thereby to swing the free end of said second-named guide rail outwardly and away from the first-named guide rail thereby to widen the receiving end of the converging throat.

3. An article-combiner comprising a metering conveyor, a combining conveyor, and a discharge conveyor, drive means for each respective conveyor, the several conveyors normally moving in the same direction, means defining a converging throat into which articles are delivered by the combining conveyor and from whose narrow end articles emerge to form a single row on the discharge conveyor, the metering conveyor, the combining conveyor and the discharge conveyor being driven, each by an independent electric motor, the motor which drives the metering conveyor being a single-speed unidirectional motor, the motor which drives the combining conveyor being a two-speed reversible motor operative, at times, to drive the combining conveyor at a normal speed and in normal forward direction and, at other times, to drive the combining conveyor in the reverse direction and at a fraction of its normal speed, and the motor which drives the discharge conveyor being a two-speed unidirectional motor operative, at times, to drive said discharge conveyor in the forward direction at normal speed and, at other times, to drive said discharge conveyor in the forward direction but at a fraction of its normal speed, and switch means operative, in response to the occurrence of a jam of articles at a predetermined point in the combiner, to break the circuits of the two last-named motors thereby temporarily to stop the metering and combining conveyors.

4. An article-combiner comprising a metering conveyor, a combining conveyor, and a discharge conveyor, drive means for each respective conveyor, the several conveyors normally moving in the same direction, means defining a converging throat into which articles are delivered by the combining conveyor and from whose narrow end articles emerge to form a single row on the discharge conveyor, in combination, means operative automatically to stop the metering conveyor and the combining conveyor in response to the jamming of articles within said converging throat, the metering conveyor, the combining conveyor and the discharge conveyor being driven, each by an independent electric motor, the motor which drives the metering conveyor being a single-speed unidirectional motor, the motor which drives the combining conveyor being a two-speed reversible motor, and the motor which drives the discharge conveyor being a two-speed unidirectional motor, a primary switch operative, in response to the occurrence of a jam of articles in the converging throat, to break the circuits of the motors for the metering and combining conveyors, thereby to stop said latter conveyors, and means operative, if the jam is not broken within a predetermined interval after said switch is opened, automatically to increase the width of the entrance end of the converging throat.

5. An article-combiner comprising a metering conveyor, a combining conveyor, and a discharge conveyor, drive means for each respective conveyor, the several conveyors normally moving in the same direction, means defining a converging throat into which articles are delivered by the combining conveyor and from whose narrow end articles emerge to form a single row on the discharge conveyor, in combination, means operative automatically to stop the metering conveyor and the combining conveyor in response to the jamming of articles within said converging throat, the metering conveyor, the combining conveyor and the discharge conveyor being driven, each by an independent electric motor, the motor which drives the metering conveyor being a single-speed unidirectional motor, the motor which drives the combining conveyor being a two-speed reversible motor, and the motor which drives the discharge conveyor being a two-spaced unidirectional motor, a primary switch operative, in response to the occurrence of a jam of articles in the converging throat, to break the circuits of the motors for the metering and combining conveyors, thereby to stop said latter conveyors, and means operative, if the jam is not automatically broken within a predetermined interval of time after the primary switch is opened, to reduce the speed of the discharge conveyor by 50% and concomitantly to start the motor which drives the combining conveyor in the reverse direction and at one-half normal speed.

6. An article-combiner comprising a metering conveyor, a combining conveyor, and a discharge conveyor, drive means for each respective conveyor, the several conveyors normally moving in the same direction, means defining a converging throat into which articles are delivered by the combining conveyor and from whose narrow end articles emerge to form a single row on the discharge conveyor, in combination, means operative automatically to stop the metering conveyor and the combining conveyor in response to the jamming of articles within said converging throat, the metering conveyor, the combining conveyor and the discharge conveyor being driven, each by an independent electric motor, the motor which drives the metering conveyor being a single-speed unidirectional motor, the motor which drives the combining conveyor being a two-speed reversible motor, and the motor which drives the discharge conveyor being a two-speed unidirectional motor, a primary switch operative, in response to the occurrence of a jam of articles in the converging throat, to break the circuits of the motors for the metering and combining conveyors, thereby to stop said latter conveyors, and means operative, when a jam is broken, following the slowing down of the delivery conveyor, the reversal of the combining conveyor, and the widening of the receiving end of the converging throat, first to close the primary switch, and, after a predetermined time interval, to stop the motor which has been driving the combining conveyor reversely and, to restore the receiving end of the converging throat to its normal width; means operative, after a further predetermined time interval, to start the motor which drives the combining conveyor in normal direction and at normal speed and to restore the speed of the discharge conveyor to normal; and means operative, after a predetermined further interval of time, to start the motor which drives the metering conveyor.

7. An article-combiner comprising a metering conveyor, a combining conveyor, and a discharge conveyor, drive means for each respective conveyor, the several conveyors normally moving in the same direction, means defining a converging throat into which articles are delivered by the combining conveyor and from whose narrow end articles emerge to form a single row on the discharge conveyor, in combination, means operative automatically to stop the metering conveyor and the combining conveyor in response to the jamming of articles within said converging throat, the metering conveyor, the combining conveyor and the discharge conveyor being driven, each by an independent electric motor, the motor which drives the metering conveyor being a single-speed unidirectional motor, the motor which drives the combining conveyor being a two-speed reversible motor, and the motor which drives the discharge conveyor being a two-speed unidirectional motor, a primary switch operative, in response to the occurrence of a jam of articles in the converging throat, to break the circuits of the motors for the metering and combining conveyors, thereby to stop said latter conveyors, and wherein a pivotally supported article-guiding rail defines one side of the converging throat, the pivot for said rail being disposed near to the narrow delivery end of the throat, and rail-actuaing means normally holding the free end of said rail in position such that the receiving end of the throat is of normal width, and means whereby, upon the occurrence of a jam of articles in the throat which is not relieved within a predetermined interval of time after the jam first occurs, said actuating means is energized to swing said guide rail thereby to widen the receiving end of the converging throat.

8. An article-combiner comprising a metering conveyor, a combining conveyor, and a discharge conveyor, drive means for each respective conveyor, the several conveyors normally moving in the same direction, means defining a converging throat into which articles are delivered by the combining conveyor and from whose narrow end articles emerge to form a single row on the discharge conveyor, in combination, means operative automatically to stop the metering conveyor and the combining conveyor in response to the jamming of articles within said converging throat, and the metering conveyor is of a width sufficient to accommodate a plurality of parallel rows of articles and the delivery conveyor is of a width to accommodate but a single row of articles, means operative normally to drive the metering conveyor at a linear velocity $Sm$ (in feet per minute) where $$Sm = \frac{N \times d}{k \times 12}$$

$N$ being the number of articles per minute, which are to be delivered in a single row by the apparatus; $d$ is the diameter in inches of each article; and $k$ is the number of parallel rows of articles which the metering conveyor can accommodate; the speed J of the combining conveyor is $SM \times 4.5$; and the speed T of the delivery conveyor is $J \times 1.1$.

9. The combination according to claim 7, wherein elongate leaf springs are secured to the guide rails which define the converging throat thereby to apply resilient pressure to the articles as they are moved toward the narrow end of the throat by the combining conveyor.

References Cited in the file of this patent

UNITED STATES PATENTS

| | | |
|---|---|---|
| 2,920,738 | Carter | Jan. 12, 1960 |
| 2,936,060 | Carter | May 10, 1960 |